US011952970B1

(12) United States Patent
Klier

(10) Patent No.: US 11,952,970 B1
(45) **Date of Patent: *Apr. 9, 2024**

(54) FLUID BOOSTER SYSTEM

(71) Applicant: William F. Klier, Palm Harbor, FL (US)

(72) Inventor: William F. Klier, Palm Harbor, FL (US)

(73) Assignee: Pressure Drop Technology Integration, Inc., Palm Harbor, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/130,748

(22) Filed: Apr. 4, 2023

Related U.S. Application Data

(63) Continuation of application No. 17/523,005, filed on Nov. 10, 2021, now Pat. No. 11,619,194, which is a continuation of application No. 17/410,665, filed on Aug. 24, 2021, now Pat. No. 11,199,160.

(51) Int. Cl.

| | |
|---|---|
| ***F02M 25/00*** | (2006.01) |
| ***F02D 19/06*** | (2006.01) |
| ***F02M 37/00*** | (2006.01) |
| ***F02M 37/04*** | (2006.01) |

(52) U.S. Cl.
CPC ......... *F02M 25/00* (2013.01); *F02D 19/0607* (2013.01); *F02D 19/0628* (2013.01); *F02D 19/0639* (2013.01); *F02D 19/0673* (2013.01); *F02M 37/0011* (2013.01); *F02M 37/0047* (2013.01); *F02M 37/04* (2013.01)

(58) Field of Classification Search
CPC ............... F02M 25/00; F02M 37/0011; F02M 37/0047; F02M 37/04; F02D 19/0607; F02D 19/0628; F02D 19/0639; F02D 19/0673
See application file for complete search history.

(56) References Cited

U.S. PATENT DOCUMENTS 3,979,115 A * 9/1976 Bruckner ................. B65H 7/06 271/227

* cited by examiner

*Primary Examiner* — Jacob M Amick
*Assistant Examiner* — Charles J Brauch
(74) *Attorney, Agent, or Firm* — Nicholas Pfeifer; Smith & Hopen, P. A.

(57) ABSTRACT

A fuel booster system having a fuel inlet port, a fuel outlet port, and a fuel accumulator fluidically coupled to both ports. The fuel inlet port allows fuel to be delivered to the fuel accumulator and the fuel outlet port is in fluid communication with a combustion engine to deliver fuel from the fuel booster system to the combustion engine. A source of pressurized gas is also fluidically coupled to the fuel accumulator to deliver pressurized gas through a gas port in one end of the fuel accumulator. A piston is located within the fuel accumulator and the source of pressurized gas can be discharged into the fuel accumulator to force accumulated fuel from the fuel accumulator and to the engine when the fuel booster system determines that the engine needs more fuel.

20 Claims, 13 Drawing Sheets

FLUID BOOSTER SYSTEM

CROSS-REFERENCE TO RELATED APPLICATIONS

This nonprovisional application is a continuation of and claims priority to nonprovisional application Ser. No. 17/523,005, entitled "FUEL BOOSTER SYSTEM," filed Nov. 10, 2021 by the same inventor, which is a continuation of and claims priority to nonprovisional application Ser. No. 17/410,665, entitled "FUEL BOOSTER SYSTEM," filed Aug. 24, 2021 by the same inventor.

BACKGROUND OF THE INVENTION

1. Field of the Invention

This invention relates, generally, to fluid delivery systems for engines. More specifically, it relates to systems for increasing fluid delivery to high performance motors.

2. Brief Description of the Prior Art

High performance motor vehicles are designed to maximize power output. With combustion engines, more power output requires more fuel. Without the correct amount of fuel, the engine will fail. Thus, it is imperative that the fuel pump(s) keep up with the demand of the engine.

There are several conventional approaches to increase fuel delivery to the motor. One such approach includes increasing the voltage on the existing fuel pump motor to push the fuel pump motor beyond its factory-designed speed, resulting in greater fuel delivery. Another approach is to add one or more additional fuel pumps to supplement the factory-provided fuel pump.

However, each of these approaches has downfalls. Pushing a fuel pump beyond its intended operational speed can burn out the fuel pump. Typically, the fuel pump burns out without the vehicle operator knowing and the engine fails to receive sufficient fuel resulting in engine failure. Using multiple fuel pumps typically results in a massive overabundance of available fuel flow that results in wasted energy to produce when the motor is operating below its maximum output, such as on a daily commute. There are some multi-fuel pump systems that have ON/OFF control systems or pump speed controls; however, these are complex systems with multiple points of possible failure.

High performance vehicles also experience extreme gravitational forces during use, which can alter the flow of oil to the engine and/or various parts of the engine and other components.

Accordingly, what is needed is a more efficient, effective, and simple system and method to provide additional fluid to the engine on demand and preferably only when required. However, in view of the art considered as a whole at the time the present invention was made, it was not obvious to those of ordinary skill in the field of this invention how the shortcomings of the prior art could be overcome.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The long-standing but heretofore unfulfilled need for more efficient, effective, and simple system and method to provide additional fuel to the engine on demand and only when required is now met by a new, useful, and nonobvious invention.

The novel structure of the fuel booster system includes a fuel inlet port, a fuel outlet port, and a fuel accumulator fluidically coupled to both ports. The fuel inlet port allows fuel to be delivered to the fuel booster system and the fuel outlet port is in fluid communication with the combustion engine to deliver fuel from the fuel booster system to the combustion engine. In some embodiments, the fuel inlet port is fluidically coupled to a first fuel line, which is in fluid communication with an existing fuel pump and delivers fuel into the fuel booster system. The fuel outlet port is fluidically coupled to a second fuel line, which is in fluid communication with the combustion engine and delivers fuel from the fuel booster system to the combustion engine.

The fuel accumulator has a hollow main body extending between a first end and a second end with a predetermined maximum fill volume, a fuel accumulator port located proximate the first end, and a gas port located proximate the second end. A piston resides within the hollow main body of the fuel accumulator. Fuel directed into the fuel accumulator forces the piston to move from the first end of the fuel accumulator to the second end of the fuel accumulator and the piston acts as a seal between the first end and the second end of the fuel accumulator. In some embodiments, the piston has a pneumatic end and a fuel end with each end having a differently shaped contacting surface, thereby creating different surface areas and in turn a pressure differential between the two ends.

Some embodiments include a fuel accumulator valve in fluid communication with the fuel inlet port. The fuel accumulator valve is configured to direct at least a portion of fuel into the fuel accumulator. In some embodiments, the fuel accumulator valve is adjustable to vary the amount of fuel directed into the fuel accumulator. In some embodiments, a control system adjusts the fuel accumulator valve to vary the amount of fuel directed into the fuel accumulator. Some embodiments further include a fill level sensor configured to detect the amount of fuel accumulated in the fuel accumulator.

A source of pressurized gas is also fluidically coupled to the fuel accumulator to deliver pressurized gas through the gas port. Some embodiments include a pneumatic accumulator having a hollow main body extending between a first end and a second end. The pneumatic accumulator houses pressurized gas and is fluidically coupled to the fuel accumulator to deliver pressurized gas to the fuel accumulator through the gas port. In some embodiments, the gas source is configured to deliver pressurized gas to the pneumatic accumulator and increase the pressure in the pneumatic accumulator.

The fuel booster system also includes a pneumatic control valve. The pneumatic control valve has a closed position and a first open position. The first open position allows gas to flow from the pneumatic accumulator to the fuel accumulator and the closed position prevents the flow of gas from the pneumatic accumulator to the fuel accumulator.

Some embodiments include a control system in communication with an engine sensor and the pneumatic control valve. The control system is configured to move the pneumatic control valve to the first open position when the engine sensor senses that an engine's absolute air induction meets a predetermined threshold. In some embodiments, the control system is configured to move the pneumatic control valve to the first open position when the control system determines that the amount of fuel or fuel pressure provided to the combustion engine meets a predetermined threshold.

Some embodiments further include a fuel pressure sensor configured to detect the amount of fuel pressure that the engine is receiving. The control system is configured to communicate with the fuel pressure sensor to determine when the amount of fuel or fuel pressure provided to the combustion engine meets the predetermined threshold.

Regardless of the sensor the control system can adjust the pneumatic control valve to allow pressurized gas to enter the fuel accumulator through the gas port and the pressurized gas forces the piston to move towards the first end of the fuel accumulator to discharge accumulated fuel through the fuel accumulator port and through the fuel outlet port.

Some embodiments further include an exhaust port fluidically coupled to the pneumatic control valve. The pneumatic control valve has a second open position, wherein the second open position allows any pressurized gas in the fuel accumulator to flow out of the gas port in the fuel accumulator and through the exhaust port.

Some embodiments of the fuel booster system include a first manifold block and a second manifold block, with the fuel accumulator and the pneumatic accumulator residing between the first and second manifold blocks. Each of the first and second manifold blocks includes internal channels to direct the flow of fuel or pressurized gas.

Some embodiments further include a pressure regulator fluidically coupled to the pneumatic control valve to adjust the pressure of the pressurized gas before the pressurized gas enters the fuel accumulator. In some embodiments, the pressure of the pressurized gas entering the fuel accumulator is greater than a pressure of the fuel accumulated in the fuel accumulator.

In some embodiments, the invention described herein is used to deliver oil or other fluids instead of fuel. In such embodiments, the term "fuel" encompasses oil and/or other fluids to be delivered to an engine or vehicle system.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

In the following detailed description of the preferred embodiments, reference is made to the accompanying drawings, which form a part thereof, and within which are shown by way of illustration specific embodiments by which the invention may be practiced. It is to be understood that other embodiments may be utilized, and structural changes may be made without departing from the scope of the invention.

As used in this specification and the appended claims, the singular forms “a,” “an,” and “the” include plural referents unless the content clearly dictates otherwise. As used in this specification and the appended claims, the term “or” is generally employed in its sense including “and/or” unless the context clearly dictates otherwise.

The phrases “in some embodiments,” “according to some embodiments,” “in the embodiments shown,” “in other embodiments,” and the like generally mean the particular feature, structure, or characteristic following the phrase is included in at least one implementation. In addition, such phrases do not necessarily refer to the same embodiments or different embodiments.

The present invention includes a system and method that is a less complicated, safer, and less expensive approach to insure adequate on-demand fuel flow to an internal combustion engine. The present invention is configured to supply fuel to maintain a predetermined pressure for a predefined volume of fuel when the fuel pump fails to do so under heavy load conditions. More specifically, the present invention is configured to instantaneously increase or decrease the flow of fuel to an engine. As a result, the present invention can prevent engine damage when the engine is under heavy load and would normally run low on fuel pressure and flow, which would cause internal damage to the engine from an extreme lean air/fuel ratio.

The present invention is also designed to run as a stand-alone system or simultaneously with an existing fuel pump depending on the application. The present invention works well with a closed or dead-end fuel system and does not require a recirculation or relief valve with a return line to the fuel tank, which would be inefficient and produce heat in the fuel as a result of that inefficiency. Furthermore, the present invention is a non-parasitic load on the engine. The system does not require the primary engine to generate the fuel flow and pressure to the engine. This freed up energy could then be used to add more power to the drive train of a vehicle or machine giving it increased performance. Even the occasional weekend drag racer can use the present invention with a standard performance low cost stock fuel pump to run a drag car and still produce enough fuel and pressure to run unlimited horsepower. The present invention can even run a top fuel nitro-methane dragster, which would greatly reduce parasitic losses.

Figure 1A:
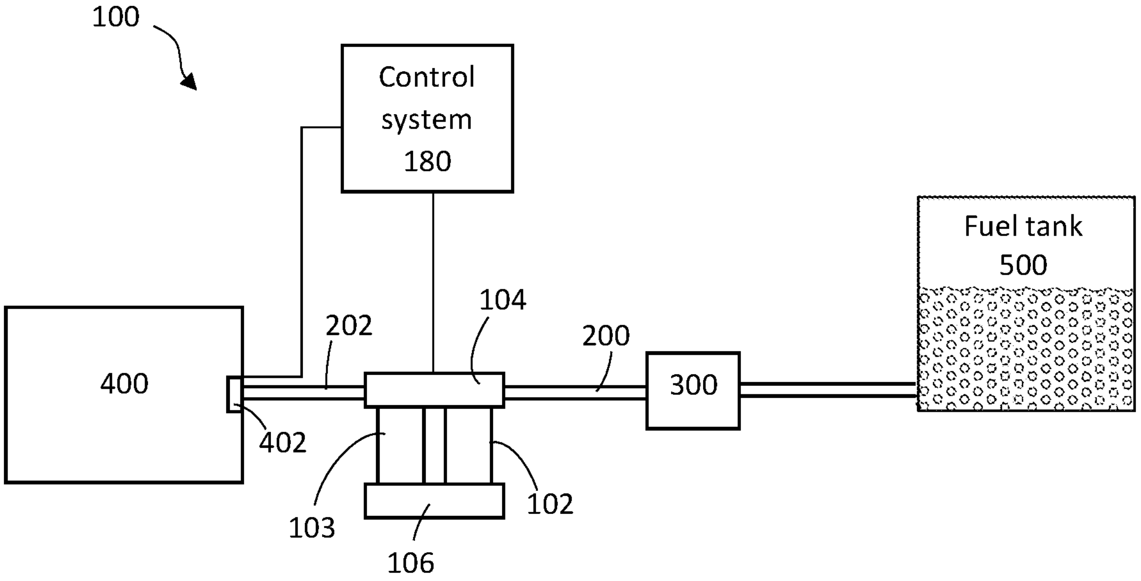
FIG. 1A is a schematic of an embodiment of the present invention.

As shown in FIG. 1A, an embodiment of fuel booster system 100 of the present invention can be tied into the existing fuel supply system. Fuel booster system 100 ties into a fuel line (separated into two lines 200, 202 by fuel booster system 100) between existing fuel pump 300 and engine 400. As will be explained in greater detail below, fuel booster system 100 routes a portion of the fuel provided from fuel pump 300 into fuel booster system 100. Fuel booster system 100 collects a predetermined volume of fuel in a controlled manner so as to ensure engine 400 receives adequate fuel while fuel booster system 100 collects fuel. Fuel booster system 100 monitors the fuel needs of engine 400 and uses pressurized gas to discharge the accumulated fuel if engine 400 is not receiving adequate fuel from fuel pump 300.

Figure 1B:
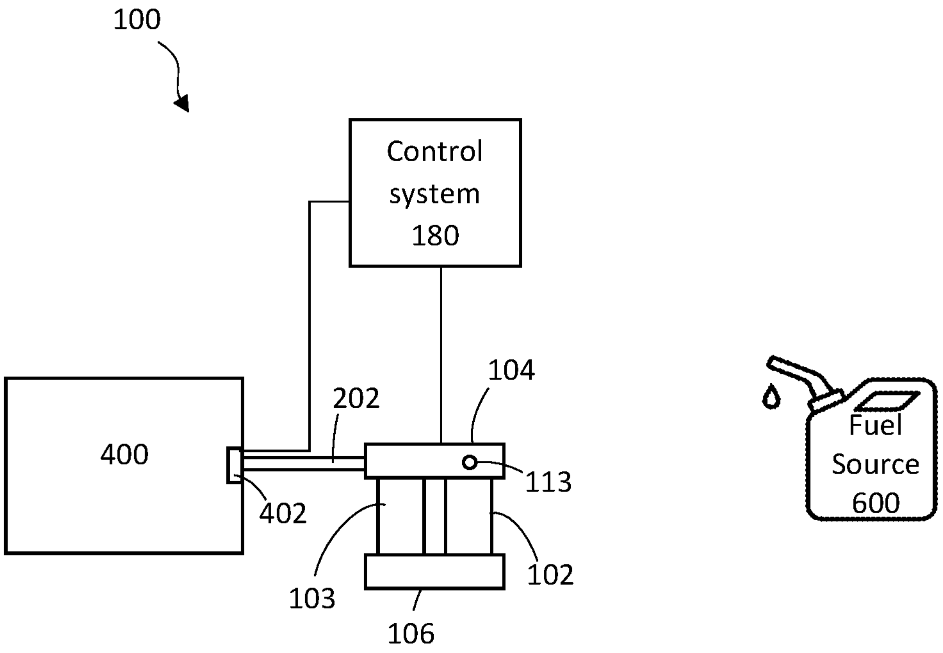
FIG. 1B is schematic of an embodiment of the present invention.

Some embodiments of fuel booster system 100, as depicted in FIG. 1B, are configured to operate independent of an existing fuel pump and/or are configured to be filled with fuel from external fuel source 600 rather than from an existing fuel pump. Such embodiments include manual fuel filling port 113 with a valve for filing fuel booster system 100 independent of an existing fuel pump 300. This operation may be useful for drag racing events to reduce the parasitic load from the fuel pump while still providing adequate fuel pressure to the engine. Some embodiments may include both a manual filling port and a fuel inlet port connected to a fuel line in fluid communication with existing fuel pump 300. Some embodiments of fuel booster system 100 include a remote fuel pump or an ON/OFF selectable onboard fuel pump to fill fuel accumulator 102 with fuel.

As provided in the simplified embodiments in FIG. 2, fuel accumulator 102 and pneumatic accumulator 103 are arranged in side-by-side orientation with channel(s) 136 extending therebetween such that the two accumulators are fluidically coupled. This orientation allows fuel booster system 100 to maximize volume in a compact form. Some embodiments, however, may include the two accumulators arranged in an alternative relative positions so long as they are fluidically coupled to each other. Moreover, some embodiments may include multiple fuel accumulators and/or multiple pneumatic accumulators.

As depicted in FIGS. 2-3, accumulators 102 and 103 each have an elongated cylindrical, tubular shape. While, accumulators 102 and 103 must have at least a partial tubular design to collect fuel and gas, respectively, they may have an alternative cross-sectional shapes known to a person of ordinary skill in the art.

Fuel booster system 100 is configured to accumulate fuel 101 in fuel accumulator 102 and pressurized gas 107 in pneumatic accumulator 103. It should be noted that the term “gas” refers to a substance in a state in which the substance has no fixed shape or volume. Pneumatic accumulator 103 may house/receive gas in the form of nitrogen, nitrous oxide, nitrogen dioxide, air, helium, argon, carbon dioxide or other readily available gases (excluding oxygen). In addition, pneumatic accumulator 103 may be filled/pressurized manually or in response to a signal instructing the system to fill/pressurize pneumatic accumulator 103. Moreover, pneumatic accumulator 103 may rely on ambient air, be attachable to a gas source to be pre-filled or may be connected to a gas source (e.g., an onboard pneumatic tank filled with pressurized gas) to allow for continuous refilling. In some embodiments, fuel booster 100 includes an onboard air compressor to pressurize pneumatic accumulator 103. The air compressor may pull gas from the environment or from a pneumatic tank Moreover, pneumatic accumulator 103 is pre-pressurized with gas 107 to ensure that the system is properly charged prior to use. Because pneumatic accumulator 103 and fuel accumulator 102 are fluidically coupled through channel 136, pneumatic control valve 150 is provided to control the flow of pressurized gas through channel 136 and thus between fuel accumulator 102 and pneumatic accumulator 103.

Fuel accumulator 102 also houses piston 105, which is configured to slidably translate from one end a fuel accumulator to the other when subject to pressure. In addition, piston 105 acts as a seal to ensure that accumulated fuel 101 does not mix with any pressurized gas 107 discharged from pneumatic accumulator 103 through channel 136 into fuel accumulator 102.

Figure 2A:
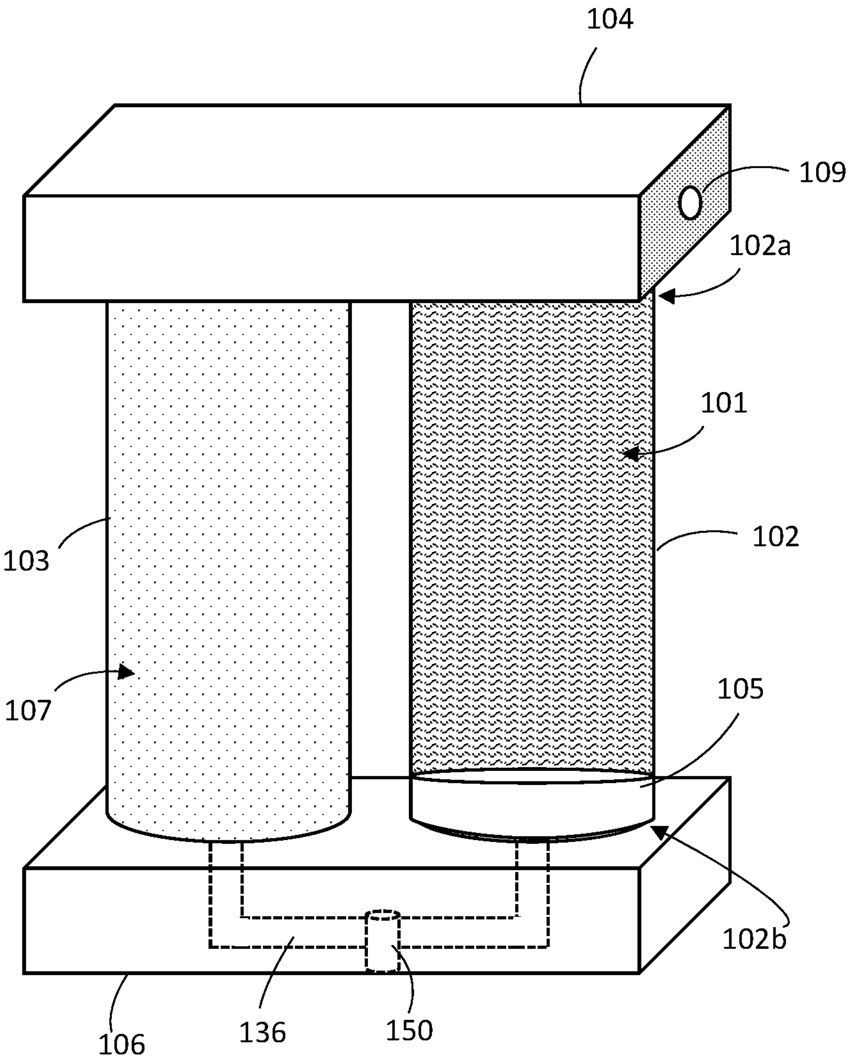
FIG. 2A is a perspective view of a simplified embodiment of the present invention in which the system is fully charged.
Figure 2B:
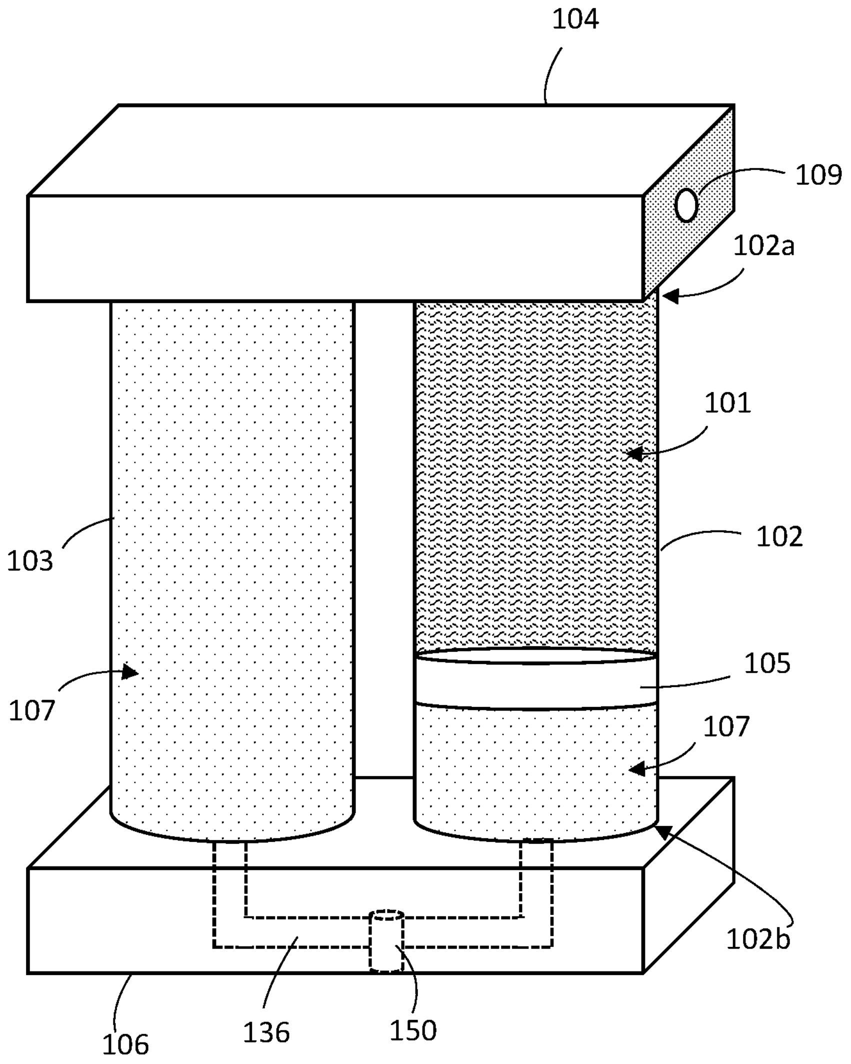
FIG. 2B is a perspective view of a simplified embodiment of the present invention illustrating a point at which pressurized gas has entered the fuel accumulator.
Figure 3A:
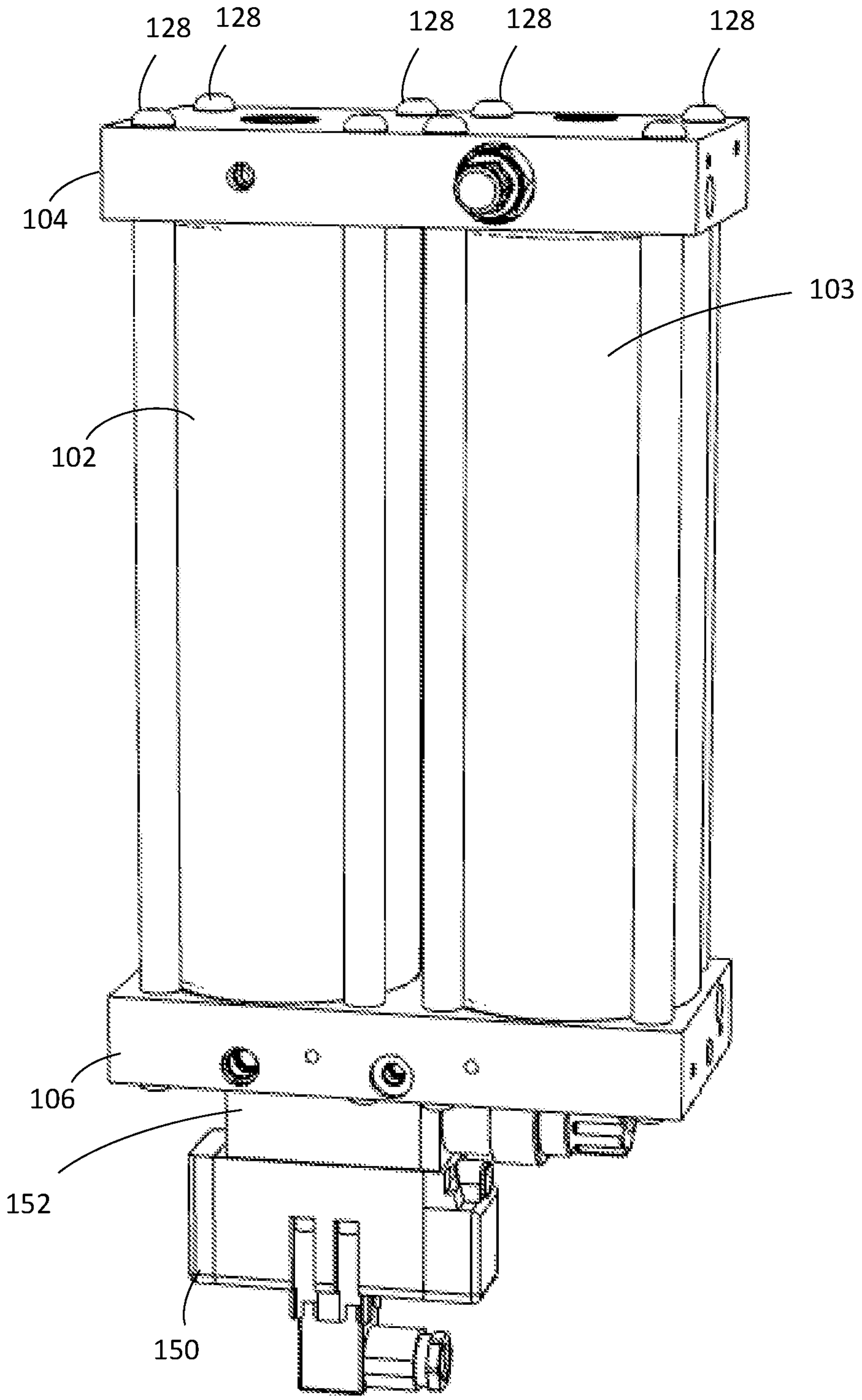
FIG. 3A is a perspective view of an embodiment of the fuel booster system.
Figure 3B:
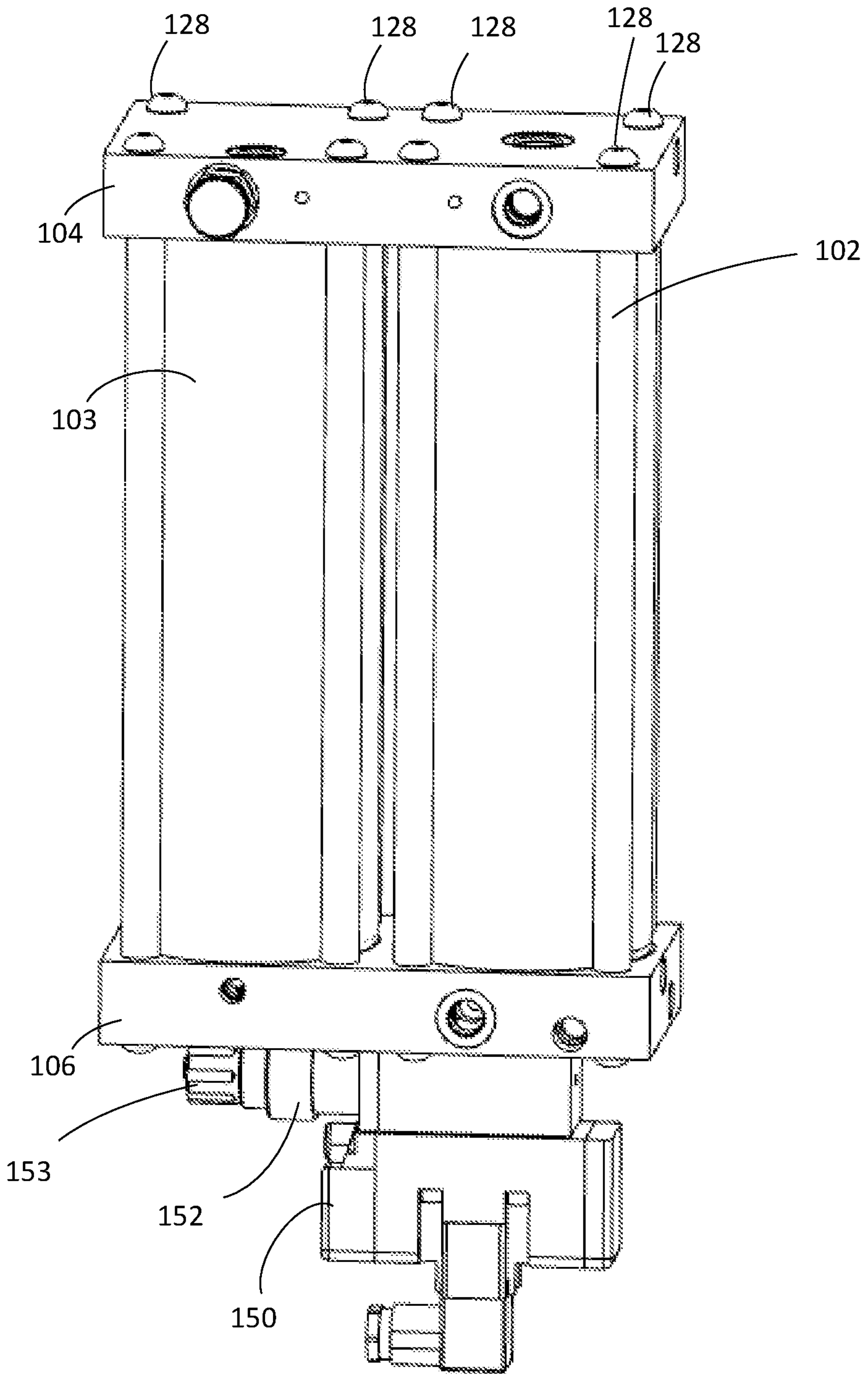
FIG. 3B is a perspective view of an embodiment of the fuel booster system opposite of the view in FIG. 3A.
Figure 3C:
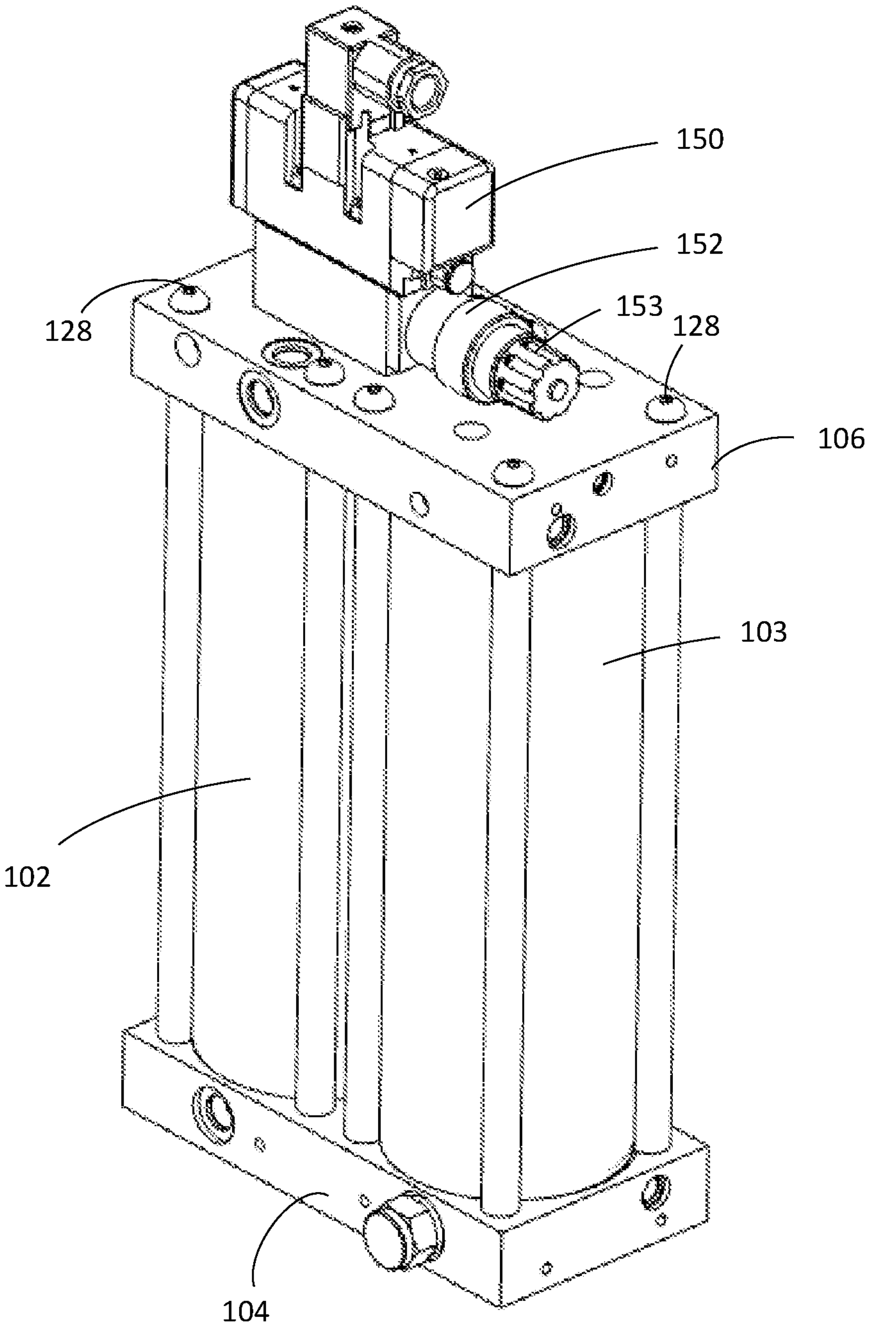
FIG. 3C is a perspective view of an embodiment of the fuel booster system in an inverted orientation relative to the orientation shown in FIG. 3A.
Figure 3D:
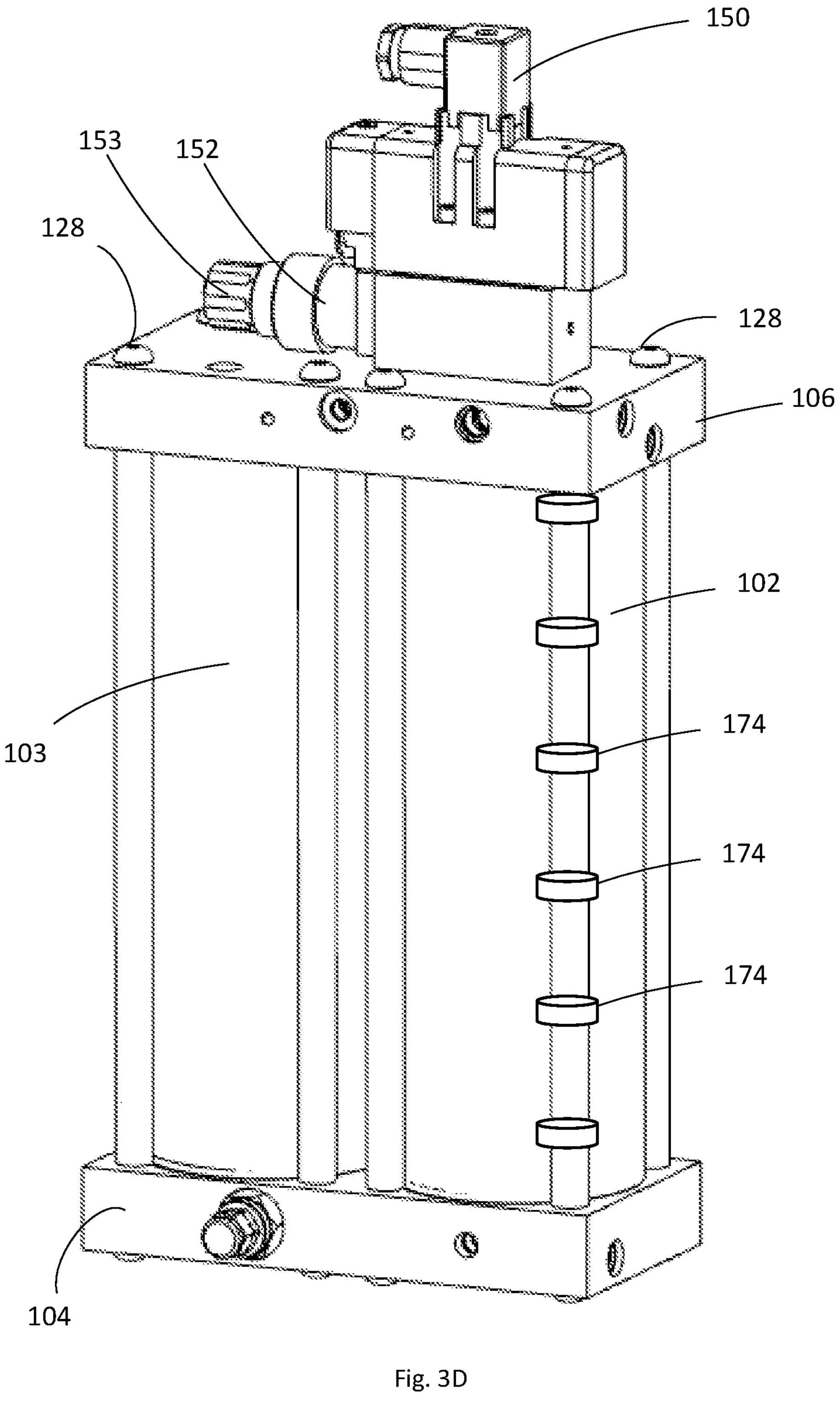
FIG. 3D is a perspective view of an embodiment of the fuel booster system opposite of the view in FIG. 3C.

Prior to discharging accumulated fuel 101, fuel booster system 100 accumulates fuel 101 within fuel accumulator 102. Ideally, the entire available volume of fuel accumulator 102 will be filled with accumulated fuel 101 and piston 105 will be forced by accumulated fuel 101 to second end 102*b* of fuel accumulator 102 as depicted in FIG. 2A. However, the needs of the engine control when fuel booster system 100 discharges accumulated fuel 101 to the engine. Fuel booster 100 is configured to detect when the engine is not receiving adequate fuel pressure and in response, pneumatic control valve 150 is opened to release pressurized gas 107. When pneumatic control valve 150 opens, pressurized gas 107 enters fuel accumulator 102 and forces piston 105 to move towards first end 102*a* of fuel accumulator 102. Piston 105 forces accumulated fuel 101 to exit fuel accumulator 102 where accumulated fuel 101 is directed to the engine. This action is represented by FIG. 2B showing pressurized gas 107 forcing piston 105 to move from its fully charged position in FIG. 2A towards first end 102*a* of fuel accumulator 102.

Typically, engine 400 will have an existing fuel sensor system having a fuel pressure sensor (see sensor 402 in FIG. 1) configured to determine the fuel pressure being supplied to engine 400. If the fuel sensor system determines that engine 400 requires more fuel pressure, the system sends a signal to fuel pump 300 to increase the fuel pump motor which creates a higher fuel pressure. If the load, or in this case engine 400, requires more fuel than fuel pump 300 can deliver, the fuel system pressure will drop. Without fuel booster system 100, this situation could result in engine failure. However, with fuel booster system 100 installed, fuel booster system 100 detects the need for additional fuel pressure and pressurizes pneumatic accumulator 103 to force piston 105 to discharge the additional fuel stored in fuel accumulator 102, which is directed to engine 400.

As will be explained in greater detail in subsequent paragraphs, fuel booster system 100 is configured to detect engine 400's need for additional fuel and discharges accumulated fuel at a rate that is necessary to obtain the engine's commanded fuel pressure. The maximum discharge flow rate of fuel booster system 100 is limited to the size of outlet fuel line 202, internal channels 108, and other piping components between fuel booster system 100 and engine 400. However, fuel booster system 100 may be specifically designed to account for these pressure losses.

In some embodiments, fuel booster system 100 is predesigned in accordance with an algorithm based on an engine's intended application and desired output. Parameters of the algorithm may include but are not limited to expected maximum horsepower engine output, expected duration of this level of horsepower output, type of fuel being used, maximum pressure required to maintain, existing fuel pump(s) maximum output flow, existing fuel pump(s) maximum pressure at maximum flow, and any future possible changes that will affect any of these values. All of these parameters are determined prior to determining the actual fuel storage capacity of fuel booster system 100 and in some cases, the size of the piping network of fuel booster system 100.

More specifically, the capabilities of the existing system (without fuel booster system 100) are known and thus one could determine the delta between the needed fuel versus the capabilities of the existing system. Once that delta is known, fuel booster system 100 is designed to ensure that it can provide at least enough additional fuel to cover the calculated delta. As a simplistic example, if the maximum fuel consumption rate of engine 400 and maximum output of fuel pump 300 are known, one could determine the volume of fuel accumulator 102 and output flow rate/pressure to cover the delta between the maximum fuel consumption rate of engine 400 and maximum output of fuel pump 300.

Moreover, some embodiments are designed with specific materials based on the intended fuel type of the engine. Certain materials do not interact well with certain fuel types. Thus, in order to avoid catastrophic failure, various components of fuel booster system 100 are comprised of predetermined material based on expected contact with certain fuel types.

Referring now to FIGS. 2-5, fuel booster system 100 includes first manifold block 104 and second manifold block 106. Fuel accumulator 102 and pneumatic accumulator 103 are secured between first and second manifold blocks 104, 106 using fasteners 128 or any other attachment mechanisms known to a person of ordinary skill in the art. Accumulators 102, 103 are sealed at both ends to the manifold blocks using a compatible to eliminate leaks.

Some embodiments of accumulators 102, 103 are comprised of extruded 6061-T6 aluminum alloy and are clear anodized for corrosion resistance and appearance. However, alternative materials resistant to various fuel types may be used. Bore sizes, wall thicknesses, and stroke lengths may vary depending on the intended application as discussed above.

Each manifold block 104, 106 includes a series of internal channels. Preferably, the internal channels are machined internally in a manifold arrangement within each manifold block. This design reduces the potential leak points and reduces the overall envelope size of fuel booster system 100.

Alternative embodiments of fuel booster system 100 do not employ manifold blocks. Rather, these embodiments employ a series of caps and piping to control the flow of fluid to the appropriate locations. In addition, the piping may be flexible or rigid and is comprised of a material resistant to various known fuel types and gases.

Figure 4A:
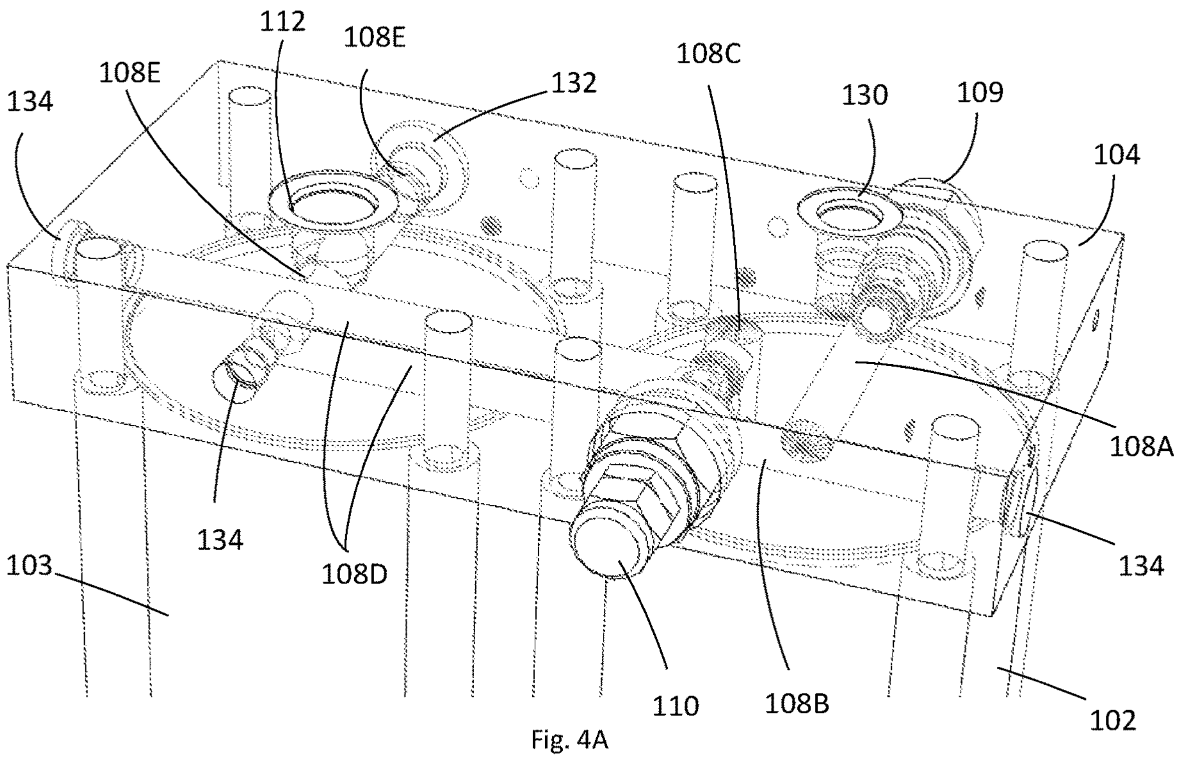
FIG. 4A is a perspective view of the first manifold block shown in a transparent manner to illustrate the internal piping network.
Figure 4B:
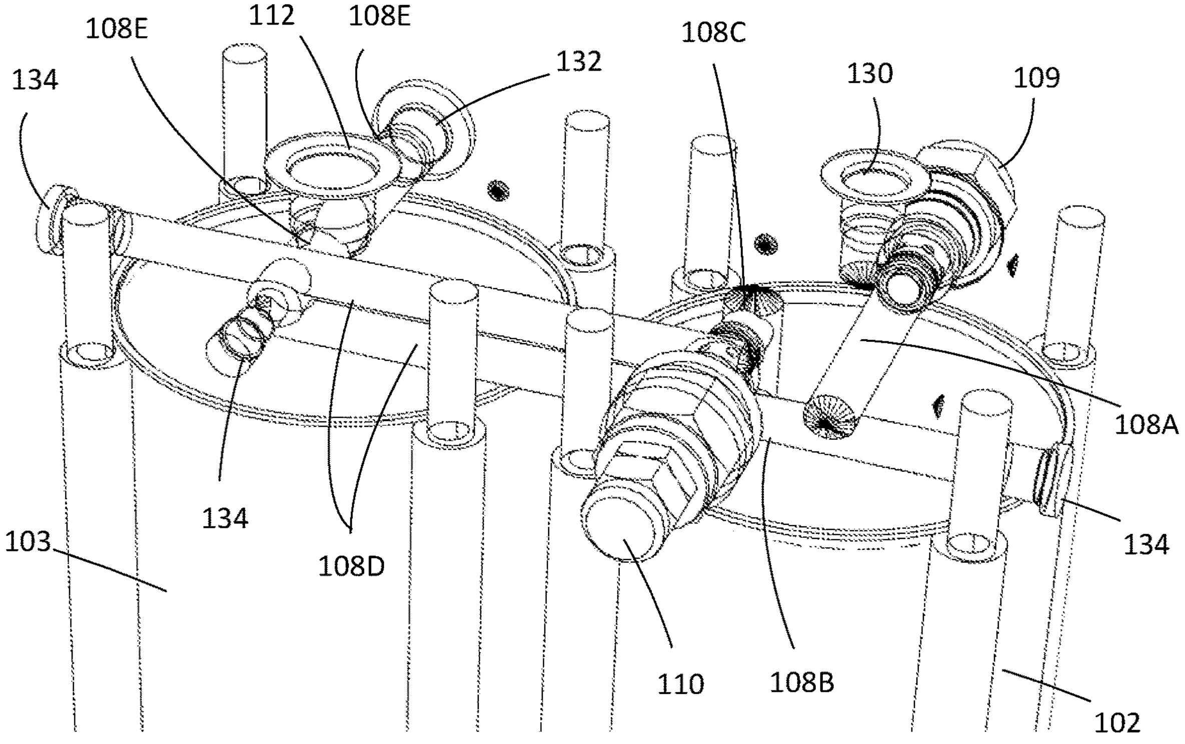
FIG. 4B is a perspective view of the internal piping network within the first manifold block.
Figure 4C:
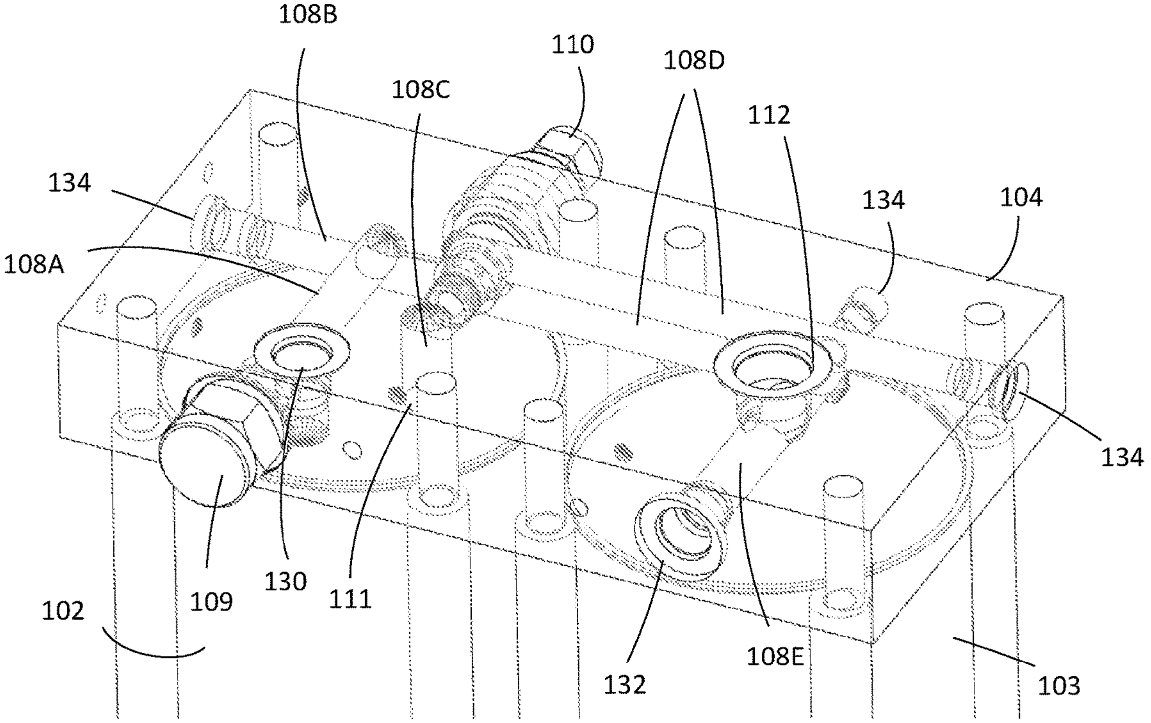
FIG. 4C is a perspective view of the first manifold block shown in a transparent manner from an orientation opposite of that shown in FIG. 4A.

As best depicted in FIGS. 4, first manifold block 104 includes fuel inlet port 109, which is configured to connect to inlet fuel line 200. Fuel inlet port 109 may include any attachment mechanism configured to attach to a fuel line, a fuel line coupler, or any other mechanism configured to fluidically connect two components. Some embodiments include multiple fuel inlet ports 109 on different surfaces of manifold block 104 to account for the various possible orientations of fuel booster system 100.

Fuel inlet port 109 provides a passage through which fuel enters fuel booster system 100. Ideally, fuel booster system 100 includes a check valve in fluid communication with fuel inlet port 109. As shown in the depicted embodiment, manifold block 104 includes valve recess 130 configured to receive a check valve (not shown). The check valve is in fluid communication with fuel inlet port 109 to prevent the backflow of fuel through fuel inlet port 109.

After entering first manifold block 104, fuel passes through channel 108A to channel 108B. Channel 108B directs the fuel from inlet port 109 to fuel accumulator valve 110. Valve 110 directs fuel into channel 108C and/or channel(s) 108D.

Channel 108C leads to fuel accumulator port 111, which is fluidically connected to fuel accumulator 102 to discharge fuel therein. Channel(s) 108D lead to fuel outlet port 112, which connects to outlet fuel line 202 and ultimately leads to engine 400. Preferably, channel(s) 108D and outlet port 112 have a larger cross-sectional area than fuel inlet port 109 and channels 108A and 108B to allow a greater volume of fuel to flow to engine 400 when needed. In addition, fuel booster 100 may include a single channel 108D or multiple channels 108D to allow for greater flow out of fuel booster 100.

Depending on the fill level of fuel accumulator 102 and the fuel demand of engine 400, valve 110 directs incoming fuel to channel 108C and/or channel(s) 108D. During normal engine operation, valve 110 is configured to direct a portion of the incoming fuel into fuel accumulator 102 until fuel accumulator 102 is full.

In some embodiments, valve 110 only regulates the flow rate of fuel moving into fuel booster 100 and allows maximum discharge in the reverse direction—from fuel accumulator 102 through valve 110 and into channel(s) 108D towards outlet port 112. Thus, valve 110 allows fuel booster system 100 to assist fuel pump 300 in supplying fuel to engine 400 when fuel pump 300 cannot keep up with the fuel demand or if fuel pump 300 should fail for some reason.

In some embodiments, valve 110 is cartridge valve. In such embodiments, manifold block 104 includes a cartridge slot configured to receive cartridge valve 110. Cartridge valve 110 can be threadedly secured to manifold block 104 through corresponding thread receipts in the cartridge slot, secured to manifold block 104 with a cap, or secured to manifold block 104 through any other method known to a person of ordinary skill in the art.

In some embodiments, cartridge valve 110 is preconfigured to direct a certain volume of fuel into accumulator 102 based on the fuel pressure needs of engine 400. However, once accumulator 102 is completely filled, cartridge valve 110 directs all fuel to engine 400. Valve 110 may inherently determine when fuel accumulator 102 is full on account of the pressure buildup resulting from fuel accumulator 102 being full. Some embodiments, however, may use control system 180 to monitor the fill level of fuel accumulator 102 and adjust valve 110 when fuel accumulator 102 is full.

Some embodiments use alternative valve designs to control the flow of fuel to and from accumulator 102 and to engine 400. Alternative valve designs include but are not limited to solenoid valves, pressure valves, check valves, and any other valves known to a person of ordinary skill in the art. Moreover, alternative embodiments may use multiple valves rather than a single valve to direct incoming fuel to and from accumulator 102 and to engine 400.

Manifold block 104 may also include channel 108E extending from channel(s) 108D to fuel outlet port 112. Some embodiments also include a pressure gauge (not shown) secured within port 132, which is connected to channel 108E. Manifold block 104 also includes construction plugs 134 secured within additional ports 148 extending from channels 108B, 108D, and 108E. However, some embodiments may include additional gauges, valves, or other components attached to additional ports 148 rather than construction plugs. For example, some embodiments include but are not limited to Schrader valves, quick connect/disconnect couplers, pressure switches, transducers, and pressure gauges. These additional components can be used to fill or vent one or more accumulators, check the pressure of the system, and discharge the accumulated gas to fill various objects with pressurized air (e.g., the tires on a vehicle).

Figure 5A:
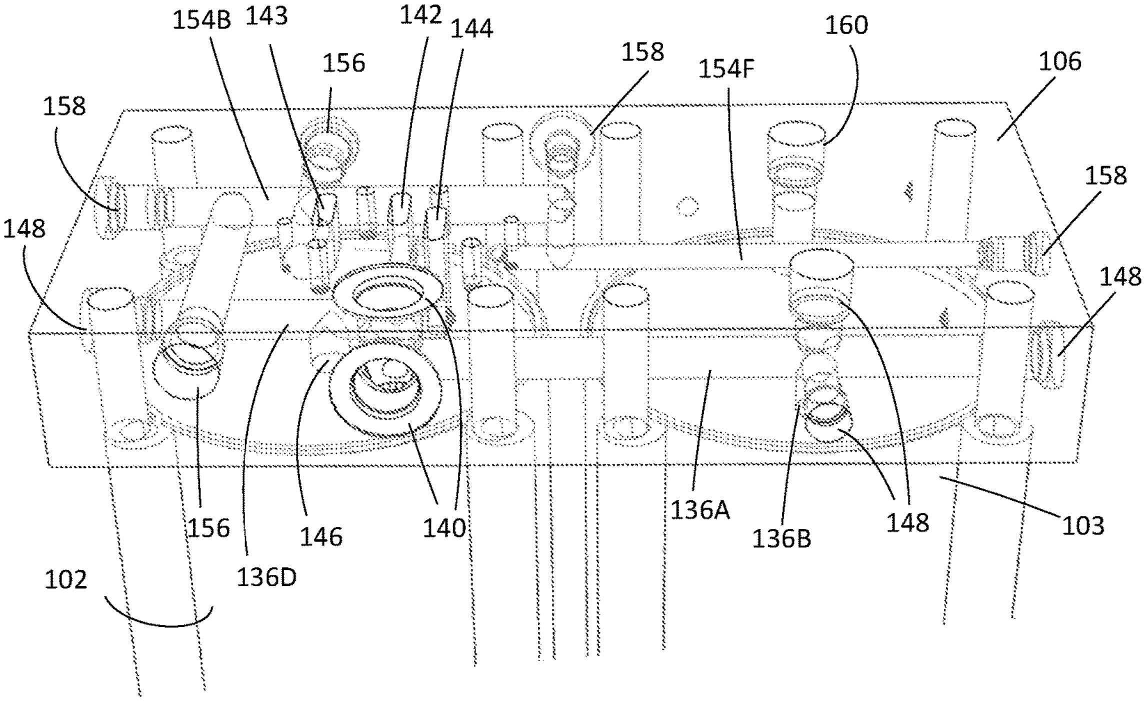
FIG. 5A is a front perspective view of the second manifold block shown in a transparent manner with the control valve and pressure regulator removed to illustrate the internal piping network.
Figure 5B:
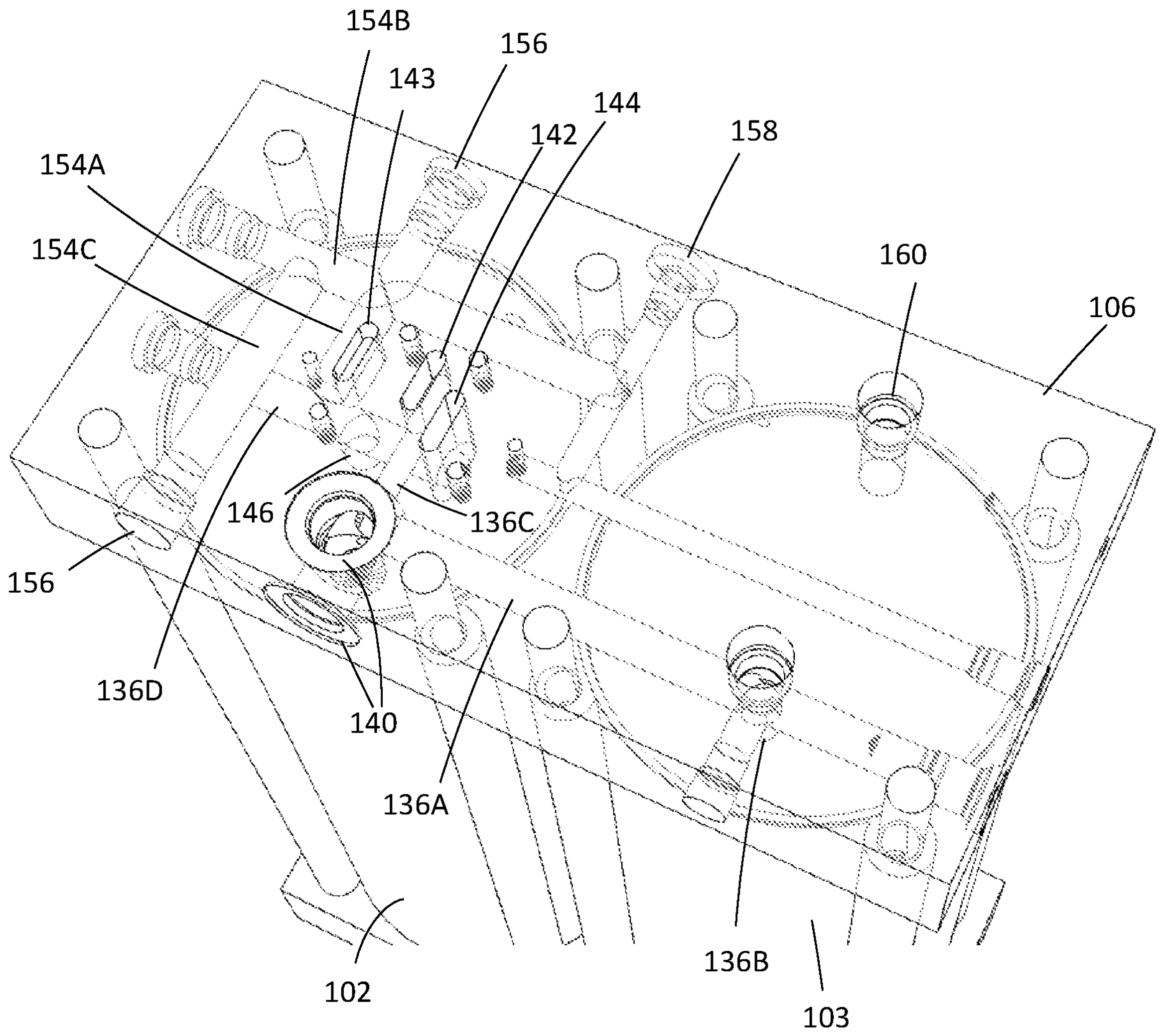
FIG. 5B is a top perspective view of the second manifold block shown in a transparent manner with the control valve and pressure regulator removed to illustrate the internal piping network.

FIGS. 5A-B depict manifold block 106 in a transparent manner with pneumatic control valve 150 and pressure regulator 152 removed to depict the internal piping network of manifold block more clearly 106. Manifold block 106 includes two piping networks. One of the piping networks is comprised of control pipes 136 and the other is comprised of flow exhaust pipes 138. Control pipes 136 direct pressurized gas into pneumatic accumulator 103 and direct the flow of accumulated gas 107 to fuel accumulator 102. Exhaust pipes 138 are configured to vent accumulated gas 107 from fuel booster system 100.

Manifold block 106 further includes one or more pneumatic inlet ports 140. Some embodiments include multiple pneumatic inlet ports 140 to account for the various possible orientations of fuel booster system 100. Pneumatic inlet ports 140 are configured to fluidically couple to a gas line or coupler secured to a gas line/source. Pneumatic inlet ports 140 may include any coupler mechanism known to a person of ordinary skill in the art that is designed to fluidically connect to a gas line or coupler secured to a gas line/source.

Some embodiments of fuel booster system 100 include an onboard air compressor capable of at least 2 times the desired maximum fuel pressure. Said embodiment also includes a 12V air compressor pump motor assembly, discharge check valve, and hose assembly that connects directly into one of the pneumatic inlet ports 140. In some embodiments, at least one pneumatic inlet port 140 is a ⅜" NPT female port configured to connect to the onboard air compressor.

Figure 5C:
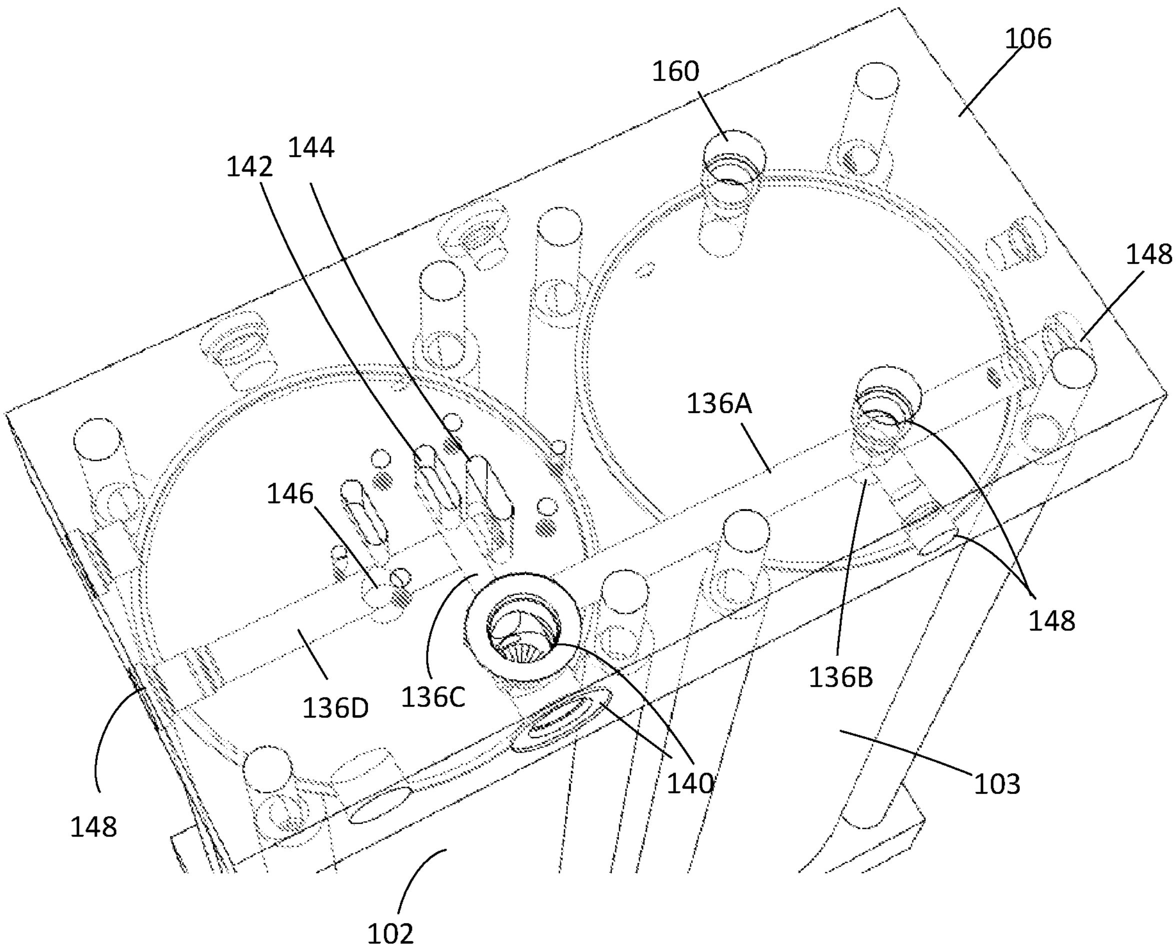
FIG. 5C is a top perspective view of the second manifold block shown in a transparent manner with the control valve, pressure regulator, and exhaust piping network removed to depict the control piping network more clearly.

FIG. 5C depicts the exhaust piping network, pneumatic control valve 150, and pressure regulator 152 removed to depict the control piping network more clearly. Pneumatic inlet ports 140 are fluidically coupled to control pipe 136A, which is fluidically coupled to control pipe 136B. Control pipe 136B is fluidically coupled to pneumatic accumulator 103. Thus, pneumatic accumulator can be filled with pressurized gas by pumping said gas through inlet port 140. Pneumatic accumulator 103 is preferably filled to a predetermined pressure (e.g., 150 psi) and the pressurized gas is stored for use by fuel booster system 100. Pneumatic accumulator 103 is preferably filled to a pressure at least greater than the pressure associated with pressure of accumulated fuel 101 when fuel accumulator 102 is completely full.

Control pipe 136A is also fluidically coupled to control pipe 136C, which is fluidically coupled to control valve inlet port 142. Control valve inlet channel 142 leads to pneumatic control valve 150 and pressure regulator 152 (see FIG. 3). Pneumatic control valve 150 includes a valve that can be closed to prevent the flow of gas or opened to allow the flow of gas from control valve inlet channel 142 to control valve outlet channel 144, which ultimately leads to fuel accumulator 102.

More specifically, control valve outlet channel 144 is fluidically connected to control pipe 136D, which is fluidically coupled to gas port 146. Gas port 146 is fluidically coupled to fuel accumulator 102 and is thus configured to discharge pressurized gas into fuel accumulator 102 when pneumatic control valve 150 is in an open position. However, in some embodiments, the default position of pneumatic control valve 150 is the closed position to stop the flow of gas from pneumatic accumulator 103 to fuel accumulator 102.

In some embodiments, pneumatic control valve 150 is an ISO solenoid pilot operated directional valve. However, some embodiments may use any control valve known to a person of ordinary skill in the art to control the flow of gas from at least one inlet channel to at least one outlet channel.

Pressure regulator 152 is also fluidically coupled to manifold block 106 and/or pneumatic control valve 150. Pressure regulator 152 is configured to limit the pressure of the gas entering fuel accumulator 102. Pressure regulator 152 may be adjustable (such as through adjustable handle 153) and/or may be set to a predetermined pressure based on the expected needs of the engine. In some embodiments, pressure regulator 152 is set to the maximum desired pressure of the fuel system times the area ratio of the two sides of piston 150, plus the total differential pressure drop from fuel output port 112 to the engine at the maximum flow requirement. In some embodiments, fuel booster system 100's control system 180 is configured to adjust the pressure regulator on the fly based on the changing needs of the engine.

Figure 5D:
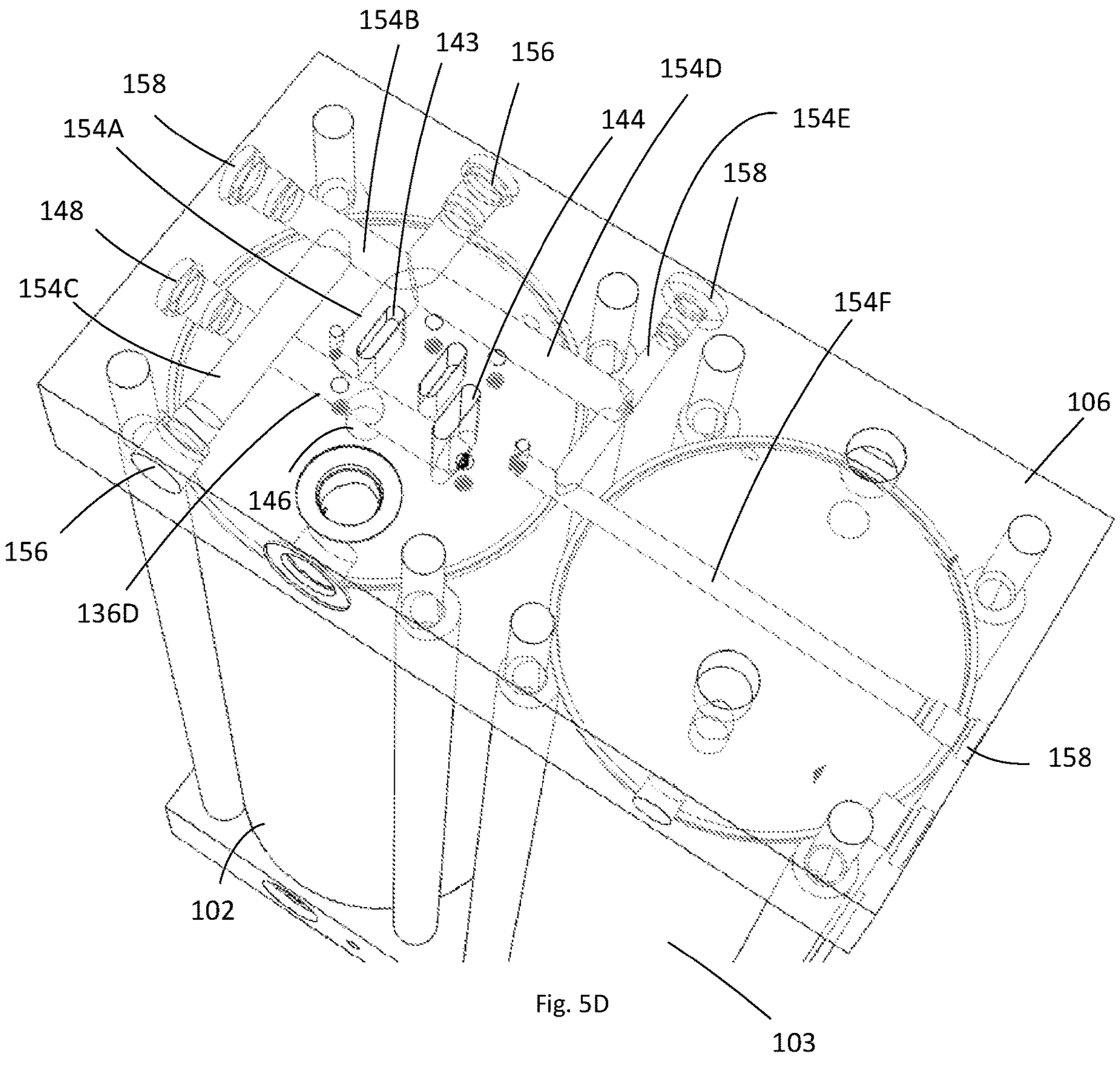
FIG. 5D is a top perspective view of the second manifold block shown in a transparent manner with the control valve, pressure regulator, and control piping network removed to depict the exhaust piping network more clearly.

FIG. 5D shows the control piping network, pneumatic control valve 150, and pressure regulator 152 removed to depict the exhaust piping network more clearly. The exhaust piping network is fluidically coupled to pneumatic accumulator 103 and fuel accumulator 102 via pneumatic control valve 150. More specifically, pneumatic control valve 150 includes control valve exhaust channel 143, which is fluidically coupled to the exhaust piping network through exhaust pipe 154A. Pneumatic control valve 150 is configured to control the flow of pressurized gas from control valve outlet channel 144 and/or inlet channel 142 to control valve exhaust channel 143. Thus, pneumatic control valve 150 can evacuate pressurized gas from pneumatic accumulator 103 and fuel accumulator 102 as needed.

When discharging pressurized gas from pneumatic accumulator 103, control valve 150 opens the valve(s) controlling inlet channel 142 and exhaust channel 143. As a result, the pressurized gas in pneumatic accumulator 103 escapes pneumatic accumulator 103 by traveling through channels 136B, 136A, 136C, and 142 where the pressurize gas enters control valve 150. From there, the pressurized gas exits exhaust channel 143 and enters the exhaust piping network through exhaust pipe 154A. The pressurized gas then passes through an exhaust port 156 to exit manifold block 106.

When discharging pressurized gas from fuel accumulator 102, control valve 150 opens the valve(s) controlling the flow from outlet channel 144 to exhaust channel 143. As a result, the pressurized gas in fuel accumulator 102 escapes pneumatic accumulator 102 by traveling through port 146, channel 136D, and then entering control valve 150 through channel 144. From there, the pressurized gas exits exhaust channel 143 and enters the exhaust piping network through exhaust pipe 154A. The pressurized gas then passes through an exhaust port 156 to exit manifold block 106.

In some embodiments, the exhaust piping network includes multiple exhaust ports 156 on different sides of manifold block 106. For example, FIG. 5D shows two oppositely arranged exhaust ports 156. One exhaust port extends from exhaust pipe 154A. The other exhaust port 156 is fluidically coupled to exhaust pipe 154A through exhaust pipes 154B and 154C.

Manifold block 106 also includes a series of additional ports 158. Depending on the location of the additional ports 158, some embodiments of manifold block 106 include additional exhaust piping 154D, 154E, and 154F. These additional ports 158 may simply be plugged with construction plugs or may be used for a variety of functions. For example, some embodiments include, but are not limited to Schrader valves, quick connect/disconnect couplers, and pressure gauges. These additional components can be used to fill or vent the accumulators, check the pressure of the system, and discharge the accumulated gas to fill various objects with pressurized air (e.g., the tires on a vehicle).

Some embodiments of fuel booster system 100 further include additional piping (not shown) leading from exhaust port(s) 156 in manifold block 106 to an exterior of a vehicle. The additional piping may be flexible or rigid and is configured to directly connect to exhaust port 156 in a sealable manner to ensure that all pressurized gas is exhausted out of the vehicle.

Some embodiments of fuel booster system 100 also include safety release valve 160 in fluid communication with pneumatic accumulator 103 (see FIGS. 5A-5B). Some embodiments may include another safety release valve in fluid communication with fuel accumulator 102. Safety release valve 160 is also preferably coupled to additional piping (not shown) leading to an exterior of a vehicle. In some embodiments, if for any reason the control system 180 detects an issue or loses signal with the vehicle, control system 180 immediately opens safety release valve 160 and vents the pressurized gas to the outside atmosphere to de-pressurize fuel booster system 100.

As previously noted, fuel booster system 100 includes piston 105 within fuel accumulator 102. Piston 105 acts as a seal to separate accumulated fuel 101 from accumulated gas 107 and is configured to translate within fuel accumulator 102 based on pressure differentials between the fuel entering fuel accumulator 102 and any pressurized gas discharged into fuel accumulator 102. The pressure of incoming fuel moves piston 105 towards distal end 102*b* of accumulator 102 and then pressurized gas 107, when discharged, forces piston 105 in the opposite direction to deliver accumulated fuel 101 to engine 400.

Figure 6A:
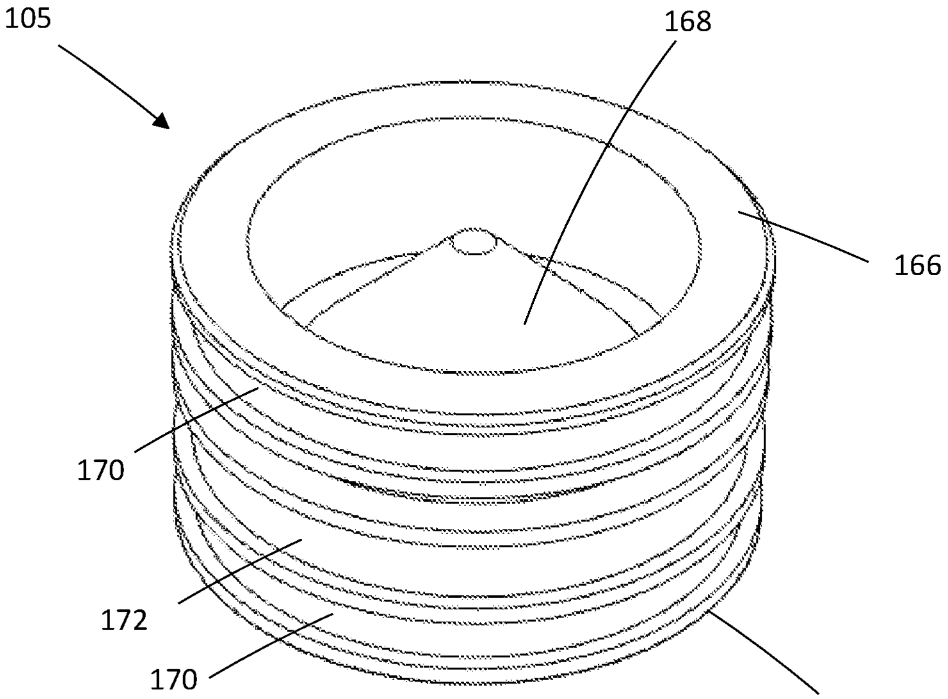
FIG. 6A is a perspective view of an embodiment of the piston.
Figure 6B:
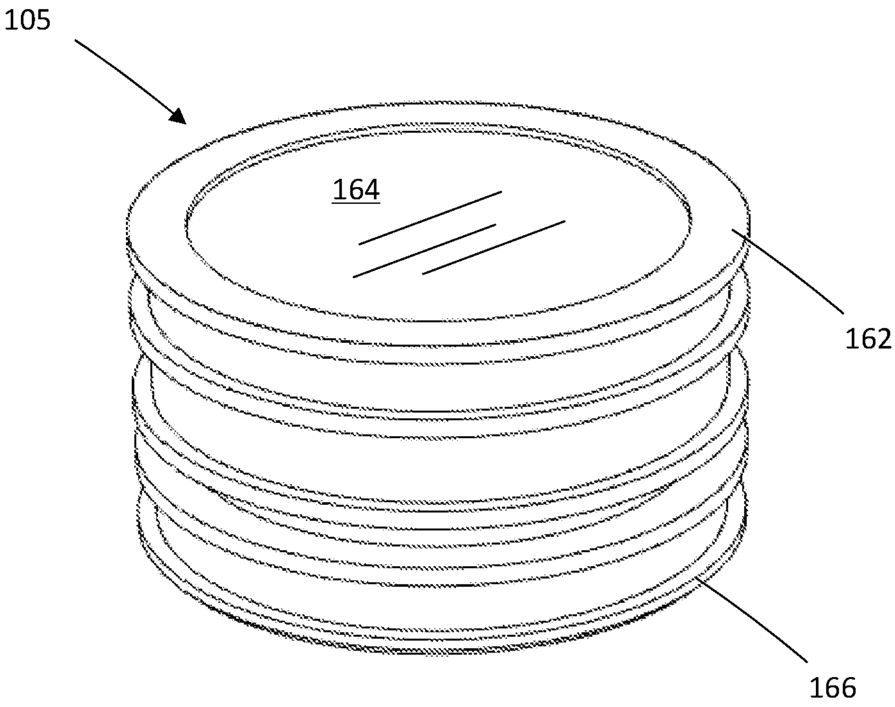
FIG. 6B is a perspective view of an embodiment of the piston that is from an opposite orientation of the piston in FIG. 6A.

Referring to FIGS. 6, piston 105 has a cross-sectional shape that matches the cross-section shape of accumulator 102 thereby allowing piston 105 to act as a seal to prevent accumulated fuel from passing through manifold block 106 and entering pneumatic accumulator 103. While the depicted embodiment of piston 105 includes an outer perimeter having a circular cross-sectional shape, piston 105 may have any cross-sectional shape that matches the cross-section shape of accumulator 102 to prevent accumulated fuel from passing through manifold block 106 and entering pneumatic accumulator 103.

To aid in the pressure-based translation, some embodiments of piston 105 have an asymmetric design. Fuel end 162 of piston 105 has a slight semi-spherical or curved surface 164 to allow for maximum initial surface area when at the physical stroke end of piston 105, i.e., when at the fully charged position shown in FIG. 2A. Pneumatic end 166 of piston 105 includes a convex cone 168 defined by a chamfer towards a center line. Convex cone 168 reduces the effective area of pneumatic end 166, which thus requires a greater pressure on pneumatic end 166 to overcome the fuel pressure applied to fuel end 162. This design is to insure that in the unlikely event of a seal leak, the fuel when under pressure will not flow into pneumatic accumulator 103 due to higher pressure on the pneumatic end 166.

In some embodiments, piston 105 is comprised of a different material that is compatible with the fuel being stored. In addition, piston 105 has a rubber energizer and four piston rings. This particular seal is designed to give excellent sealing between a gas and a liquid. In some embodiments, piston 105 has special Hercules powerband bearing rings 170 manufactured from a highly engineered blend of premium nylon, glass fiber and PTFE, designed for high strength, low coefficient of friction, and operation in applications with minimal lubrication at each end. This ensures long life and prevents scoring of the internal bore of accumulator 102.

In some embodiments, piston 105 have a flexible magnetic band 172 or magnetic objects secured thereto. In addition, fuel booster system 100 has a plurality of magnetic sensors 174 (e.g., inductive proximity sensors) (see FIG. 3D) externally positioned relative to fuel accumulator 102. The type of magnet used will allow for sensing through aluminum, brass, stainless steel, and most other non-ferrous metals. Fuel booster system 100 is thus able to detect the location of the piston relative to the various magnetic sensors. As a result, fuel booster system 100 can identify the fill level of accumulator 102 based on the location of piston 105.

Some embodiments may include alternative sensor systems known to a person of ordinary skill in the art to determine the piston's location with the fuel accumulator and/or the fill level of the fuel accumulator. As a non-limiting example, some embodiments of fuel booster system 100 employ a magnetostriction linear position sensor to detect the fuel level and produce an analog output. This device includes a bar graph indicator that accepts an analog input form the sensor. The sensor would be mounted in the end and have a sensing probe that would go through a seal in the middle of the piston. The magnetic piston ring would create a magnetic field that would interrupt the electronic signal being sent down the probe and send it back to the sensor controls. This signal is timed and would give a constant indication of the location of the piston. The signal would be converted to an analog output that fuel booster system 100 uses to display the volume of fuel being stored in real time and is also used to set when fuel booster system 100 activates and shuts down.

Some embodiments, include a visual display in communication with the sensor configured to detect the fill level of fuel accumulator 102. The visual display is therefore adapted to convey the fill level of fuel accumulator 102 to the user. The visual display may be a gauge, series of light emitting diodes, or any of information display mechanism adapted to convert the captured data from the sensors into a user-understandable display or alert. In some embodiments, the visual display includes different color LEDs that correlate to a specific fill level. For example, a blue LED corresponds to fuel accumulator 102 at 100% capacity, a green LED corresponds to fuel accumulator 102 at greater than or equal to 75% capacity, a white LED corresponds to fuel accumulator 102 at greater than or equal to 50% capacity, an amber LED corresponds to fuel accumulator 102 at greater than or equal to 25% capacity, and a red LED corresponds to fuel accumulator 102 at greater than or equal to 10% capacity. Preferably, the visual display is provided in close proximity to the driver's seat to provide real time information to the user.

Control System

Some embodiments of fuel booster system 100 include a control system 180 (see FIG. 1). Control system 180 can be embodied as any computer device, special-purpose hardware (e.g., circuitry), programmable circuitry appropriately programmed with software and/or firmware, or a combination of special-purpose and programmable circuitry. Hence, embodiments may include a machine-readable medium having stored thereon instructions which may be used to program a computer (or other electronic devices) to perform a process. The machine-readable medium may include, but is not limited to, floppy diskettes, optical disks, compacts disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

Control system 180 is configured to identify the engine's absolute air induction pressure which is indicative of the fuel pressure regardless of the type of engine. In some embodiments, control system 108 is configured to determine the engine's fuel needs/fuel pressure by connecting to the vehicles CAN network, a fuel pressure sensor, boost reference pressure switch (also called a Hob switch), a transducer, a pressure switch, or any other mechanism known to a person of ordinary skill in the art that can provide, directly or indirectly, the engine's absolute air induction pressure or current fuel requirements. Some embodiments include an aftermarket sensor located in or proximate to engine 400 to sense the fuel pressure, flow rate, and/or volume of fuel entering engine 400. Control system 180 may communicate with these devices wirelessly or via one or more wires.

Control system 180 is also configured to control fuel booster system 100. As non-limiting examples, embodiments of control system 180 can monitor, detect, and control the amount fuel directed into fuel accumulator 102, the amount of fuel stored in fuel accumulator 102, the amount of pressurized gas delivered to pneumatic accumulator 103, the pressure of accumulated gas 107 stored in pneumatic accumulator 103, venting of accumulated gas 107 stored in pneumatic accumulator 103, pressure regulator 152, the various valves, and discharging accumulated gas 107 into fuel accumulator 102 to drive piston 105 and discharge accumulated fuel 101 to engine 400. Again, control system 180 may communicate with fuel booster system 100 wirelessly or via wires.

Some embodiments of control system 180 are also configured to display various aspect of the fuel booster system 100 and/or engine 400 to a user. This may be accomplished through gauges, graphic user interfaces, or any other methods and systems for conveying information to a user.

Operation of Fuel Booster System

During operation, fuel accumulator 102 is either pre-filled with fuel or fuel booster system 100 diverts a portion of fuel from fuel pump 300 into fuel accumulator 102. In some embodiments, control system 180 is configured to control the operation of valve 110 to direct a predetermined volume of fuel into accumulator 102. Control system 180 may monitor the flow of fuel through valve 110 and/or monitor the fill level of accumulator 102 using the piston tracking approaches described herein or any other systems/methods for monitoring the fill level of accumulator 102. Moreover, control system 180 monitors the fuel demand of engine 400 and can adjust valve 110, and thus the amount fuel being diverted into fuel accumulator 102, to ensure that engine 400 is receiving a proper amount of fuel.

Pneumatic accumulator 103 is prefilled to a predetermined pressure. In some embodiments, control system 180 monitors the pressure of pneumatic accumulator 103 and can reduce the pressure as needed by controlling pneumatic control valve 150 and/or safety release valve 160. In some embodiments, control system 180 is in communication with a gas source and is configured to further pressurized pneumatic accumulator 103 as needed.

Control system 180 continuously monitors the fuel needs of engine 400 in accordance with any of the devices and techniques described herein. When control system 180 determines that fuel pump 300 is not providing sufficient fuel to engine 400, control system 180 instructs pneumatic control valve to open and release accumulated gas 107 into fuel accumulator 102. Because of the pressure differential, accumulated gas 107 exits pneumatic accumulator 103, passes through port 146, channels 136D, 144, and into pneumatic control valve 150. Pressurized gas 107 also passes through pressure regulator 152 either before or after entering pneumatic control valve 150, where the pressure of pressurized gas 107 is reduced to either a predetermined pressure or to a determined value based on engine 400's needs. Upon exiting pneumatic control valve 150 and pressure regulator 152, pressurized gas 107 flows through channels 142, 136C, 136A, 136B and into fuel accumulator 102.

In some embodiments, control system 180 is configured to adjust the pressure regulator based on the fuel needs of engine 400. For example, control system 180 may monitor the boost pressure and adjust pressure regulator 152 based on the measured boost pressure. While this example uses boost pressure, control system 180 may use any of the sensors, devices, or methods described herein or known to a person of ordinary skill in the art as the basis for dynamically adjusting pressure regulator 152.

Once pressurized gas 107 reaches fuel accumulator 102, said gas forces piston 105 towards first end 102A of fuel accumulator 102. Translation of piston 105 causes accumulated fuel 101 to exit fuel accumulator 102 through port 111, channels 108C, 108D, 108E and out of fuel outlet port 112, which is fluidically coupled to engine 400.

Control system 180 continuously monitors the fuel requirements of engine 400 and closes pneumatic control valve 150 when control system 180 determines that engine 400 no longer needs accumulated fuel 101 or when fuel accumulator 102 is empty. Control system 180 is programmed to vent the pressurized gas within fuel accumulator 102 when engine 400 no longer needs accumulated fuel 101 or when fuel accumulator 102 is empty.

During the venting process, control system 180 instructs pneumatic control valve 150 to open the valve between channel 144 and channel 143. Channel 143 is fluidically coupled to one or more exhaust ports 156, which lead to the ambient environment outside of the vehicle. Because fuel accumulator 102 contains pressurized gas 107 having a greater pressure than the ambient environment, pressurized gas 107 flows through port 146, channels 136D and 144, through pneumatic control valve 150, and out of manifold 106 through channels 143, 154A, and exhaust port 156.

Once pressurized gas 107 is vented from fuel accumulator 102, control system 180 then closes pneumatic control valve 150 and fuel booster system 100 can then begin accumulating more fuel to refill fuel accumulator 102. If needed, control system 180 also re-pressurized pneumatic accumulator 103.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A fluid booster system for an engine, comprising:

a fluid outlet port, the fluid outlet port fluidically coupled to a fluid line in fluid communication with the engine to deliver fluid from the fluid booster system to the engine;

a fluid accumulator, the fluid accumulator having a hollow main body extending between a first end and a second end, a fluid port, and a gas port;

a gas source, wherein the gas source is fluidically coupled to the fluid accumulator to deliver pressurized gas to the fluid accumulator through the gas port;

a movable sealing barrier residing within the hollow main body of the fluid accumulator, wherein the fluid directed into the fluid accumulator forces the sealing barrier to move within the fluid accumulator and the sealing barrier acts as a seal between the first end and the second end of the fluid accumulator;

a control system configured to control the flow of gas to the fluid accumulator;

whereby the flow of gas into the fluid accumulator forces the sealing barrier to move within the fluid accumulator to discharge accumulated fluid through the fluid accumulator port and through the fluid outlet port.

2. The fluid booster system of claim 1, further including:

an exhaust port in fluidic communication with the fluid accumulator, wherein the exhaust port is configured to discharge any pressurized gas in the fluid accumulator out of the gas port in the fluid accumulator to exit the vehicle.

3. The fluid booster system of claim 1, further including a pneumatic accumulator in fluidic communication with the gas source.

4. The fluid booster system of claim 1, wherein the sealing barrier has a pneumatic end and a fluid end with each end having a differently shaped contacting surface thereby creating different surface areas and in turn a pressure differential between the two ends.

5. The fluid booster system of claim 1, further including:

a first manifold and a second manifold, with the fluid accumulator residing between the first and second manifolds;

each of the first and second manifold including internal channels to direct the flow of fluid or pressurized gas.

6. The fluid booster system of claim 1, further including a fluid inlet port, the fluid inlet port fluidically coupled to an existing fluid line, wherein the fluid inlet port delivers fluid into the fluid booster system;

a fluid accumulator valve configured to vary the amount of fluid directed into the fluid accumulator.

7. The fluid booster system of claim 6, wherein the control system adjusts the fluid accumulator valve to vary the amount of fluid directed into the fluid accumulator.

8. The fluid booster system of claim 1, further including a pressure regulator fluidically coupled to a pneumatic control valve to adjust the pressure of the pressurized gas before the pressurized gas enters the fluid accumulator.

9. The fluid booster system of claim 1, wherein a pressure of the pressurized gas entering the fluid accumulator is greater than a pressure of the fluid accumulated in the fluid accumulator.

10. The fluid booster system of claim 1, further including a fill level sensor configured to detect the amount of fluid accumulated in the fluid accumulator.

11. The fluid booster system of claim 1, further including a fluid pressure sensor configured to detect the amount of fluid pressure that the engine is receiving, and the control system configured to communicate with the fluid pressure sensor to determine when the amount of fluid or fluid pressure meets the predetermined threshold.

12. A fluid booster system for an engine, comprising:

a fluid inlet port, the fluid inlet port fluidically coupled to an existing fluid line, wherein the fluid inlet port delivers fluid into the fluid booster system;

a fluid outlet port, the fluid outlet port in fluid communication with the engine to deliver fluid from the fluid booster system to the engine;

a fluid accumulator, the fluid accumulator having a hollow main body extending between a first end and a second end, a fluid accumulator port fluidically coupled to the fluid inlet port, and a gas port;

a source of pressurized gas fluidically coupled to the fluid accumulator to deliver pressurized gas through the gas port;

a control system configured to control the flow of pressurized gas into the fluid accumulator when the control system determines that the amount of fluid or fluid pressure meets a predetermined threshold;

whereby the pressurized gas entering the fluid accumulator forces accumulated fluid through the fluid outlet port.

13. The fluid booster system of claim 12, further including:

an exhaust port fluidically coupled to the fluid accumulator, wherein any pressurized gas in the fluid accumulator can be vented out of the fluid accumulator and through the exhaust port.

14. The fluid booster system of claim 12, further including:

a piston residing within the hollow main body of the fluid accumulator, wherein the fluid directed into the fluid accumulator forces the piston to move from the first end of the fluid accumulator to the second end of the fluid accumulator and the piston acts as a seal between the first end and the second end of the fluid accumulator;

wherein the piston has a pneumatic end and a fluid end with each end having a differently shaped contacting surface thereby creating different surface areas and in turn a pressure differential between the two ends.

15. The fluid booster system of claim 12, further including:

a first manifold and a second manifold, with the fluid accumulator residing between the first and second manifolds;

each of the first and second manifold including internal channels to direct the flow of fluid or pressurized gas.

16. The fluid booster system of claim 12, further including a fluid accumulator valve configured to vary the amount of fluid directed into the fluid accumulator.

17. The fluid booster system of claim 16, wherein the control system adjusts the fluid accumulator valve to vary the amount of fluid directed into the fluid accumulator.

18. The fluid booster system of claim 12, further including a pressure regulator fluidically coupled to a pneumatic control valve to adjust the pressure of the pressurized gas before the pressurized gas enters the fluid accumulator.

19. The fluid booster system of claim 12, wherein a pressure of the pressurized gas entering the fluid accumulator is greater than a pressure of the fluid accumulated in the fluid accumulator.

20. A fluid booster system for an engine, comprising:

a fluid inlet port, the fluid inlet port fluidically coupled to a first fluid line, wherein the first fluid line is in fluid communication with and delivers fluid into the fluid booster system;

a fluid outlet port, wherein the fluid outlet port is in fluid communication with the engine to deliver fluid from the fluid booster system to the engine;

a fluid accumulator, the fluid accumulator having a hollow main body extending between a first end and a second end and a fluid port;

a sealing barrier residing within the hollow main body of the fluid accumulator, wherein the sealing barrier is configured to move within the fluid accumulator when subject to a force;

a control system configured to control the force imposed on the piston;

whereby the control system causes the from the first end to move within the fluid accumulator to discharge accumulated fluid through the fluid accumulator port and through the fluid outlet port when the control system determines that the amount of fluid or fluid pressure provided a predetermined threshold.

* * * * *